US007308504B2

(12) United States Patent
Satuloori et al.

(10) Patent No.: US 7,308,504 B2
(45) Date of Patent: Dec. 11, 2007

(54) SYSTEM AND METHOD FOR DYNAMICALLY DISABLING PARTIALLY STREAMED CONTENT

(75) Inventors: Sridhar Satuloori, Nalgonda (IN); Sivasankaran R., Tamilnadu (IN)

(73) Assignee: Sun Microsystems, Inc., Santa Clara, CA (US)

( * ) Notice: Subject to any disclaimer, the term of this patent is extended or adjusted under 35 U.S.C. 154(b) by 898 days.

(21) Appl. No.: 10/614,552

(22) Filed: Jul. 7, 2003

(65) Prior Publication Data

US 2005/0010673 A1 Jan. 13, 2005

(51) Int. Cl.
*G06F 15/16* (2006.01)

(52) U.S. Cl. ...................... 709/232; 709/224; 709/228; 709/229; 709/231

(58) Field of Classification Search ................ 709/200, 709/203, 231, 223–225, 227–229, 232; 725/25, 725/86, 101
See application file for complete search history.

(56) References Cited

U.S. PATENT DOCUMENTS

| | | | | |
|---|---|---|---|---|
| 5,311,596 | A * | 5/1994 | Scott et al. | 380/33 |
| 6,006,332 | A * | 12/1999 | Rabne et al. | 726/6 |
| 6,170,016 | B1 * | 1/2001 | Nakai et al. | 709/232 |
| 6,223,292 | B1 * | 4/2001 | Dean et al. | 726/28 |
| 6,760,916 | B2 * | 7/2004 | Holtz et al. | 725/34 |
| 6,792,411 | B1 * | 9/2004 | Massey, Jr. | 705/35 |
| 6,985,936 | B2 * | 1/2006 | Agarwalla et al. | 709/221 |
| 6,996,624 | B1 * | 2/2006 | LeCroy et al. | 709/231 |
| 7,047,305 | B1 * | 5/2006 | Brooks et al. | 709/231 |
| 7,092,939 | B2 * | 8/2006 | Koll | 707/4 |
| 7,103,770 | B2 * | 9/2006 | Conrath | 713/155 |
| 7,171,567 | B1 * | 1/2007 | Bayer et al. | 713/193 |
| 2001/0051996 | A1 * | 12/2001 | Cooper et al. | 709/217 |
| 2003/0028652 | A1 * | 2/2003 | Bardini et al. | 709/229 |
| 2003/0163569 | A1 * | 8/2003 | Panasyuk et al. | 709/227 |
| 2003/0212804 | A1 * | 11/2003 | Hashemi | 709/228 |

OTHER PUBLICATIONS

"Sun StorEdge™ Media Central Streaming Server 1.0 User's Guide," Sun Microsystems, Copyright 2000, (92 pages).

* cited by examiner

*Primary Examiner*—Saleh Najjar
*Assistant Examiner*—Faruk Hamza
(74) *Attorney, Agent, or Firm*—Robert C. Kowert; Meyertons, Hood, Kivlin, Kowert & Goetzel, P.C.

(57) ABSTRACT

A system and method for dynamically disabling partially streamed content may include a server receiving a request from a client. A session may be initiated or continued in response to the request. The server may begin to stream content to the client as a partial fulfillment of the request. While processing the request, the server may determine if the partially streamed content should be disabled. In response to determining that the partially streamed content should be disabled, the server may disable the partially streamed content without terminating the session. Disabling the partially streamed content may involve preventing the client from accessing content referenced by a hyperlink associated with the partially streamed content, or may involve the use of a controller located on the client to disable content streamed to the client.

26 Claims, 8 Drawing Sheets

SYSTEM AND METHOD FOR DYNAMICALLY DISABLING PARTIALLY STREAMED CONTENT

BACKGROUND OF THE INVENTION

1. Field of the Invention

This invention relates to the field of network computer systems and, more particularly, to a mechanism for disabling content partially streamed to a client.

2. Description of the Related Art

The client/server relationship is widespread in modem networked computing, particularly in the domain of the Internet and World Wide Web. For example, a client may contact a server via a network and request a service or a piece of information. A web server may provide copies of various web pages to a plurality of clients. More specifically, a client may contact the web server with the URL of a specific web page, which may then be sent to the client and displayed for the user.

As described above, web servers primarily retrieve files from one or more data sources and transmit the information therein over a network. Alternatively or additionally, servers may execute significantly more computation in response to a client request. For example, a website may use a database in tandem with common gateway interface (CGI) scripts to provide a more dynamic content retrieval system. In such an example, a client may request information related to a certain topic from the server. The server may then execute a search for the topic on an internal database, and dynamically assemble a web page with the desired content before returning the results to the client. Additional computation may be executed on the server when handling other web-based applications, such as electronic commerce.

Because such extra computation or large content sizes may increase the turnaround time for the server responding to a client's request, the server may partially stream content, including hyperlinks, to a client while continuing to process the request. As additional content is assembled, the server may continue streaming content until the request has been fully satisfied.

However, after such content is sent to the client, it cannot typically be recalled. This may pose a problem if the server encounters any difficulties in its continuing calculations or request processing after sending partial content to the client. For example, the server may detect a security violation in further processing that makes it necessary to deny the client access to hyperlinks that have already been sent. Alternatively, the server may receive an error message or time out from a resource necessary to complete the client request, such as a database. In this scenario, the entire session may rendered invalid.

SUMMARY

A system and method for dynamically disabling partially streamed content may include a server receiving a request from a client. A session may be initiated or continued in response to the request. The server may begin to stream content to the client as a partial fulfillment of the request. While processing the request, the server may determine if the partially streamed content should be disabled. In response to determining that the partially streamed content should be disabled, the server may disable the partially streamed content without terminating the session. Disabling the partially streamed content may involve preventing the client from accessing content referenced by a hyperlink associated with the partially streamed content, or may involve the use of a controller located on the client to disable content streamed to the client.

In one embodiment, a method for dynamically disabling partially streamed content may include a server processing a request from a client. The request may initiate or continue a session between the server and the client. The method may further include streaming out content from the server to the client as a partial fulfillment of the request. While processing the request, the method may include determining if the content should be disabled, and if the content should be disabled, disabling the content without terminating the session. The content may be disabled by invalidating links associated with the partially streamed content and/or by instructing a controller on the client to disable partially streamed content received by the client.

Figure 1:
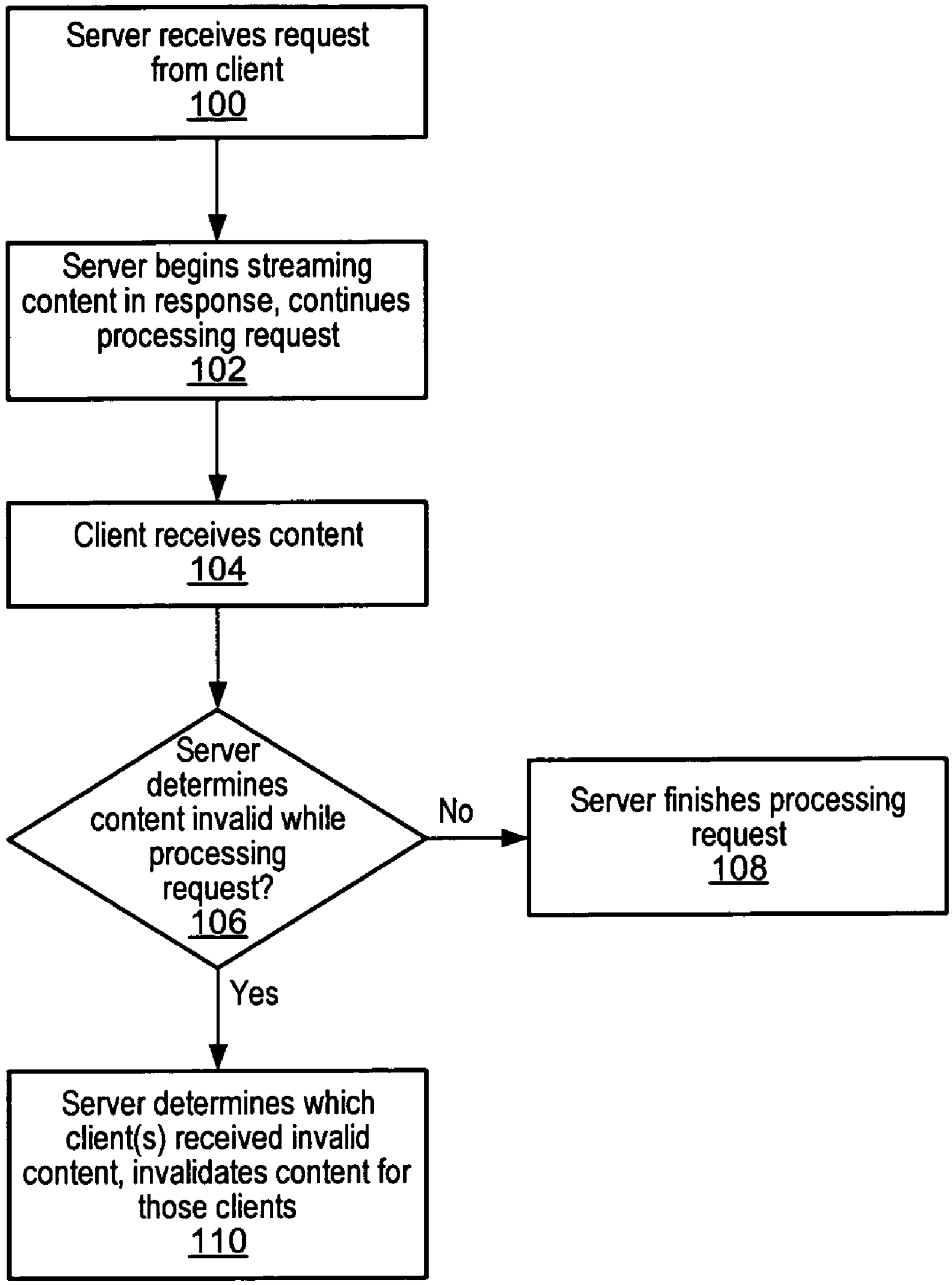
FIG. 1 is a flow diagram illustrating a method for dynamically disabling partially streamed content, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Turning now to FIG. 1, a flow diagram illustrating a method for dynamically disabling partially streamed content is shown. As will be described below, the method may be executable on a server to disable partially streamed content to a client. In one embodiment, content may include one or more hyperlinks which lead back to additional information on the server, for example. In another embodiment, content may include one more pieces of information calculated or provided as a result of a request from a client to an application on the server, as will be described below.

In 100, the server receives a request from a client. The request may begin the execution of an application process on the server, thereby initiating a session between the client and the application on the server. Or the request may be made as part of an existing session. In one embodiment, a session may comprise multiple requests and responses between the application and the client, wherein each request is operable to further control, modify, or inform the application, and each response further informs the client of the results of the request.

In 102, the application, operating through the server, may begin to stream content to the client as a partial fulfillment of the request from the client, while continuing to process the request. Content may be partially streamed out to minimize latency in the interaction between client and application. For example, in one embodiment, a request may take a significant amount of time to process entirely. The application may therefore begin to stream some results to the client as the results are determined, rather than waiting for all results to be determined before streaming all results as a single block to the client.

In 104, the client may receive content and begin to display or act upon the results therein. In one embodiment, the client may allow an end user to access one or more hyperlinks contained within the content. Accessing the hyperlinks may in turn initiate a new request to the server within the context of the session, thereby allowing the client access to additional content located on or controlled by the server.

In 106, the server may determine that some or all of the streamed content may be invalid. In one embodiment, this determination may derive from a security violation within the application, wherein the application or server determines that the client or some other process involved in the request should not have been allowed access to one or more pieces of content, for example. In another embodiment, this determination may derive from a timeout while handling the request, wherein the application or server determines that sufficient time has passed during the processing of the request to render some or all of the streamed content invalid. Other reasons are also contemplated for determining that some or all of the partially streamed content is or may be invalid.

If, in 106, the server determines that no streamed content is invalid, the server continues to process the request in 108. Alternatively, if the server determines that some of the streamed content is invalid, the server may determine which client or clients and which content should be disabled, as indicated by 110. In one embodiment, the server may examine the session data to determine which clients have received invalid content. The server may then take one or more steps to disable the content determined to be invalid. For example, the server may prevent the client that received invalid content from accessing one or more hyperlinks associated with the content, as will be described below. In another embodiment, the server may communicate with a controller on the client to disable the invalid content streamed to the client. It is noted that, in disabling the content, the server may not terminate the session between the client and the application, thereby allowing the client to continue utilizing the application and request other content without having to restart the session.

Figure 2:
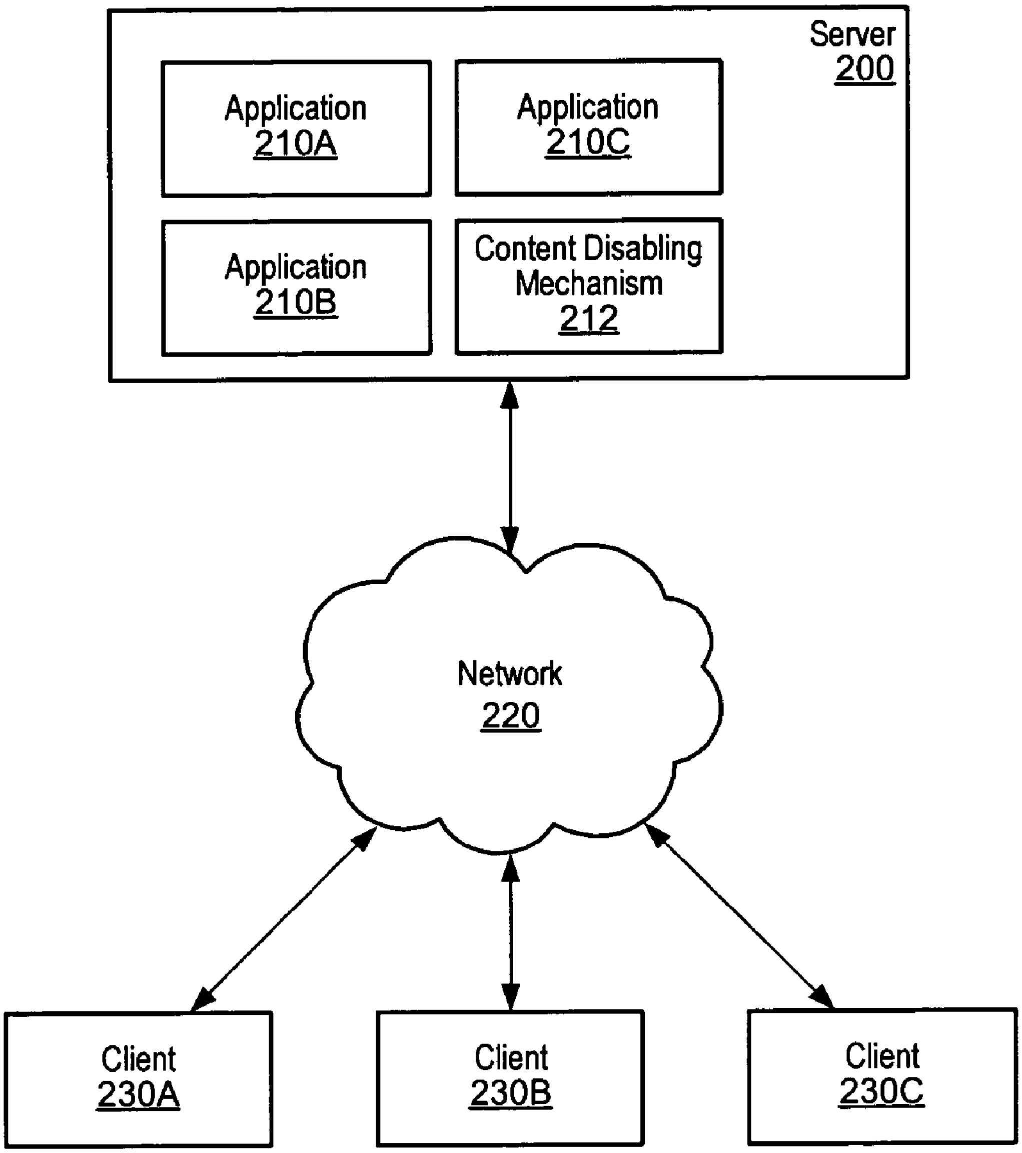
FIG. 2 is a block diagram of one embodiment of a system for dynamically disabling partially streamed content.

FIG. 2 is a block diagram of one embodiment of a system for dynamically disabling partially streamed content. Server 200 may communicate with any of the clients 230A-C via network 220. Clients 230A-C may be operable to send requests to one or more applications 210A-C on server 200, and receive content back, as described above. Network 220 may be a point-to-point fabric, a local area network (LAN), a wide area network (WAN), the Internet, any other type of computing interconnect, or a combination thereof. For the purposes of clarity it is noted that any notation in the form of, for example, A-C, may refer to any or all of the elements in the group A-C.

Applications 210A-C may be any type of application executable in a networked system. Such applications may include, but are not limited to, database applications, web applications, file server applications, or e-commerce applications, for example. Server 20 may also include a content disabling mechanism 212, as will be described below.

Content disabling mechanism 212 may implement logic to disable access to content that has been streamed out to one or more clients. In one embodiment, content disabling mechanism 212 may exist as one or more utilities or services provided in server 200 which provides various functionality to applications 210A-C. This content disabling functionality may include, but not be limited to, functionality for tracking streamed content and taking steps to disable content determined to be invalid, such as disabling hyperlinks and/or relaying content disabling messages to one or more client controllers. In one embodiment, content disabling mechanism 212 may indicate that a given hyperlink is invalid by associating an error message with the hyperlink, as will be described below.

In one embodiment, content disabling mechanism 212 may include or be interoperable with a session tracking system operable to monitor a plurality of sessions running between applications 210A-C and a plurality of end users on a plurality of clients. Such a session tracking system may additionally monitor information including, but not limited to, session ID, client ID, user ID, client address, streamed content per session, requests pending and/or requests serviced.

In one embodiment, content disabling mechanism 212 may include or be interoperable with a content lookup table, which may be operable to provide a lookup service connecting one or more streamed hyperlinks to one or more pieces of content or web pages served by server 200. For example, in one embodiment, a client 230A-C may send a request for content associated with a hyperlink to an application 210A-C on server 200. In response, application 210A-C may use a content lookup table to determine which content is associated with the hyperlink. Application 210A-C may then return the content associated with the hyperlink to client 230A-C.

Figure 3:
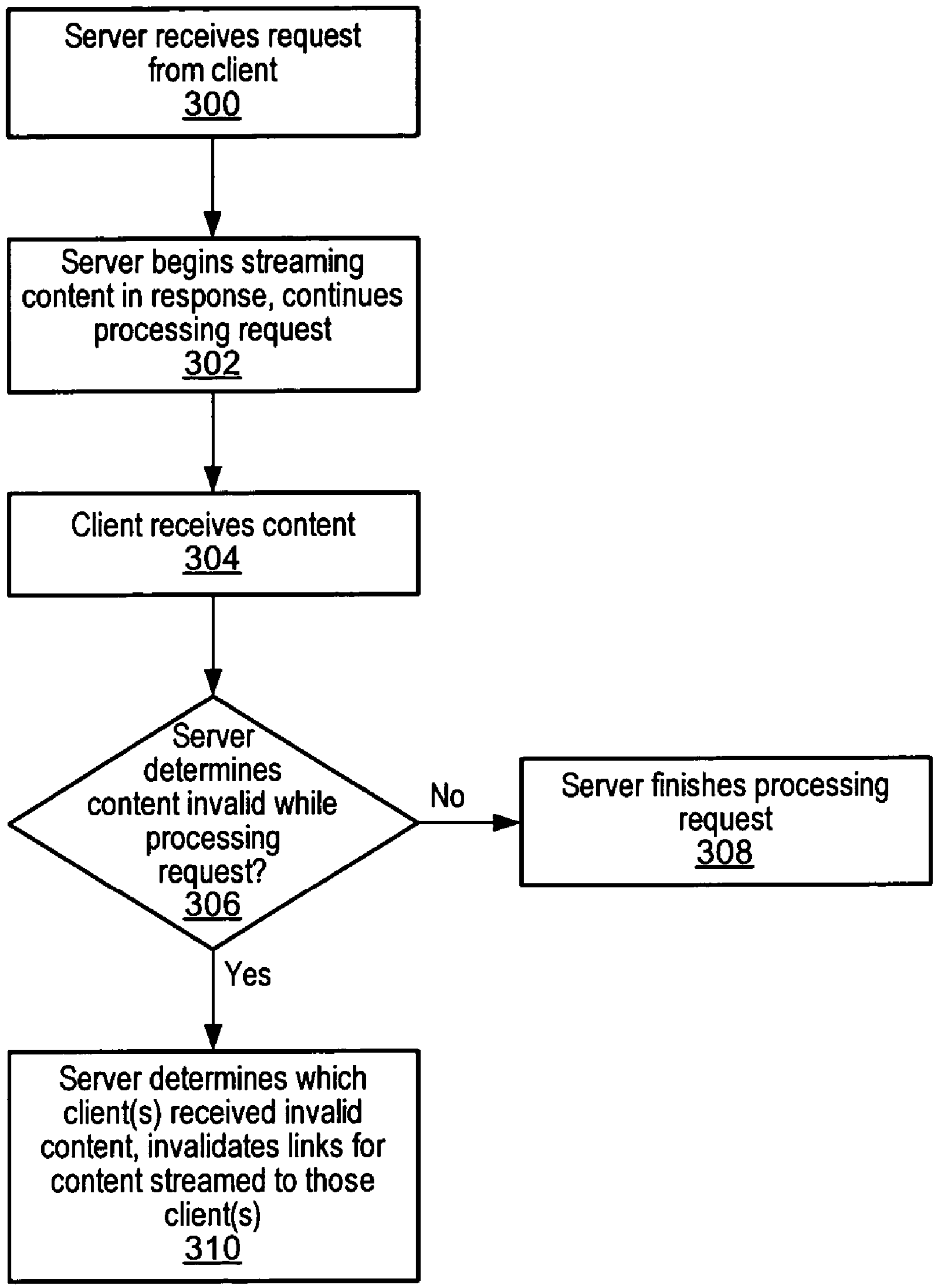
FIG. 3 is a flow diagram illustrating an embodiment of a method for dynamically disabling partially streamed content including invalidating hyperlinks.

Turning now to FIG. 3, a flow diagram illustrating a more specific embodiment of the method illustrated in FIG. 1 is shown. As will be described below, the method may be executable on a server to dynamically disable partially streamed content to a client.

Referring collectively now to FIGS. 2-3, in 300, server 200 receives a request from a client 230A-C. The request may begin a session or be part of an existing session between the client and an application 210A-C on the server. As described in FIG. 1, in one embodiment, the session may comprise multiple requests and responses between application 210A-C and client 230A-C.

In 302, application 210A-C operating through server 200 may begin to stream content to client 230A-C as a partial fulfillment of the request from client 230A-C, while continuing to process the request. Content may be partially streamed out to minimize latency in the interaction between client and application, as described in FIG. 1. It is noted that in one embodiment, content disabling mechanism 212 may track specific information on which links streamed to which client lead to which content on server 200.

In 304, client 230A-C may receive content and begin to display or act upon the results therein. In 306, content disabling mechanism 212 may determine that some or all of the content which has been streamed to client 230A-C may be invalid, as described in FIG. 1.

If, in 306, content disabling mechanism 212 determines that no streamed content is invalid, application 230A-C may continue to process the request in 308. Alternatively, if content disabling mechanism 212 determines that the streamed content is invalid, application 230A-C may advance to 310, wherein content disabling mechanism 212 determines which content for which client(s) should be disabled, as described in FIG. 1. In one embodiment, disabling content may include disabling one or more links that have been sent to a client within a session. Content disabling mechanism 212 may cause server 200 to return an error message when any of the disabled hyperlinks are accessed by client 230A-C. In one embodiment, to disable hyperlinks content disabling mechanism 212 may invalidate one or more entries in a hyperlink look-up table that corresponds hyperlinks sent to a client within a particular session to particular content.

Figure 4:
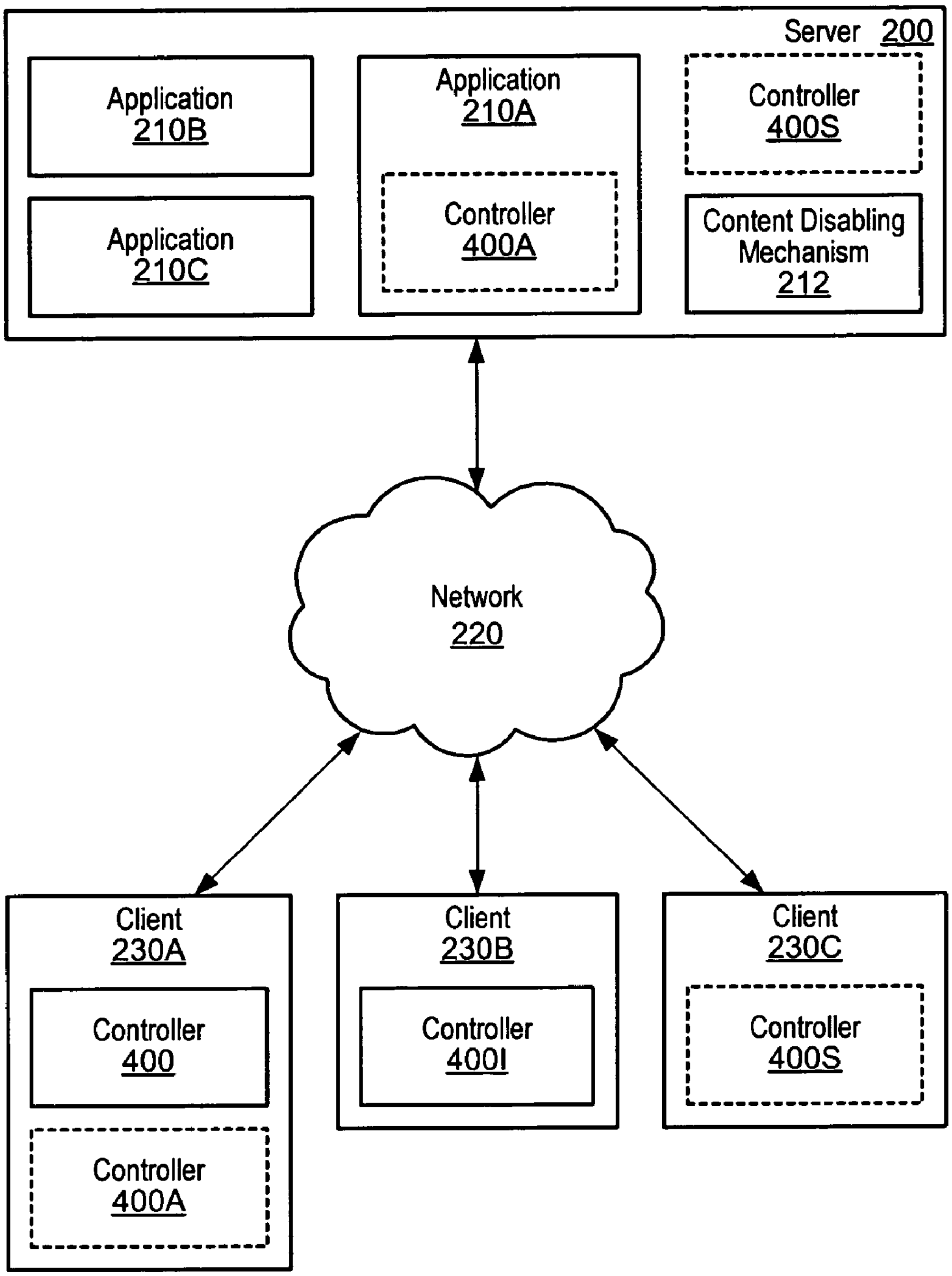
FIG. 4 is a block diagram of one embodiment of a system for dynamically disabling partially streamed content, including one or more controllers.

FIG. 4 is a block diagram of one embodiment of a system for dynamically disabling partially streamed content, similar to FIG. 2. However, in addition to content disabling mechanism 212, server 200 may also utilize one or more controllers 400 in various embodiments to disable partially streamed content, as will be described below.

The functionalities of server 200, application 210A-C, network 220, and clients 230A-C are broadly similar to the functionalities described above in FIG. 2. In addition to the functionality described above in FIG. 2, content disabling mechanism 212 may be able to remotely control controllers 400, as described below.

A Controller 400 may be operable on clients 230A-C to disable content that has been streamed to clients 230A-C from server 200. In one embodiment, a controller 400 may prevent a client 230A-C from accessing hyperlinks which reference content stored on server 200, as directed by content disabling mechanism 212. For example, controller 400 may interact with a client browser application to deactivate certain links or block certain links. In one embodiment, controller 400 may be operable to prevent clients 230A-C from accessing hyperlinks by disabling those hyperlinks on a browser display, while in another embodiment, controller 400 may be operable to return an error message whenever a disabled hyperlink is accessed.

Controller 400 may additionally or alternatively be operable to disable content on a client in other ways. For example, controller 400 may prevent content from being copied or saved to another location. Other ways of disabling content on a client are contemplated. In one embodiment, controller 400 may cache content and prevent any such content from being displayed until content disabling mechanism 212 sends an indication that the content is verified as valid, for example.

In one embodiment, controller 400 may already be installed on a client 230A-C prior to the initiation of a session, as illustrated by controller 4001 at client 230B in FIG. 4. For example, a controller 400 may be a separate process running on the client, or may be built in to a client browser application. Alternatively, a controller 400 may sent to a client 230A-C by server 200, as illustrated by client 230C in FIG. 4, for example. As will be described below, in one embodiment controller 400 may be sent to the client at the beginning of a session, while in another embodiment, controller 400 may be sent to the client after content disabling mechanism 212 has determined that certain content on a given client should be invalidated.

In one embodiment, a controller may be specific to a given application 210A-C. For example, controller 400A on client 230A in FIG. 4 may be provided by or specified by application 210A. In one embodiment, each application 210A-C may directly control an associated controller 400. In another embodiment, content disabling mechanism 212 to communicate with and control the associated controller 400. In one embodiment, an interface to a controller 400 may be specified in a descriptor file or configuration file on server 200. Content disabling mechanism 212 may access the descriptor or configuration file to locate an appropriate controller for an application and determine how to communicate with the controller and what functions are supported by the controller. In some embodiments, all controllers may follow a standard interface.

In one embodiment, server 200 may provide a controller 400 as a default controller (represent by controller 400S in FIG. 4) that may be used for all applications, or for applications that do not specify their own controller.

Controllers 400 may be installed on clients 230A-C prior to the beginning of a session, at the beginning of a session, or upon the determination that streamed content is invalid.

Figure 5:
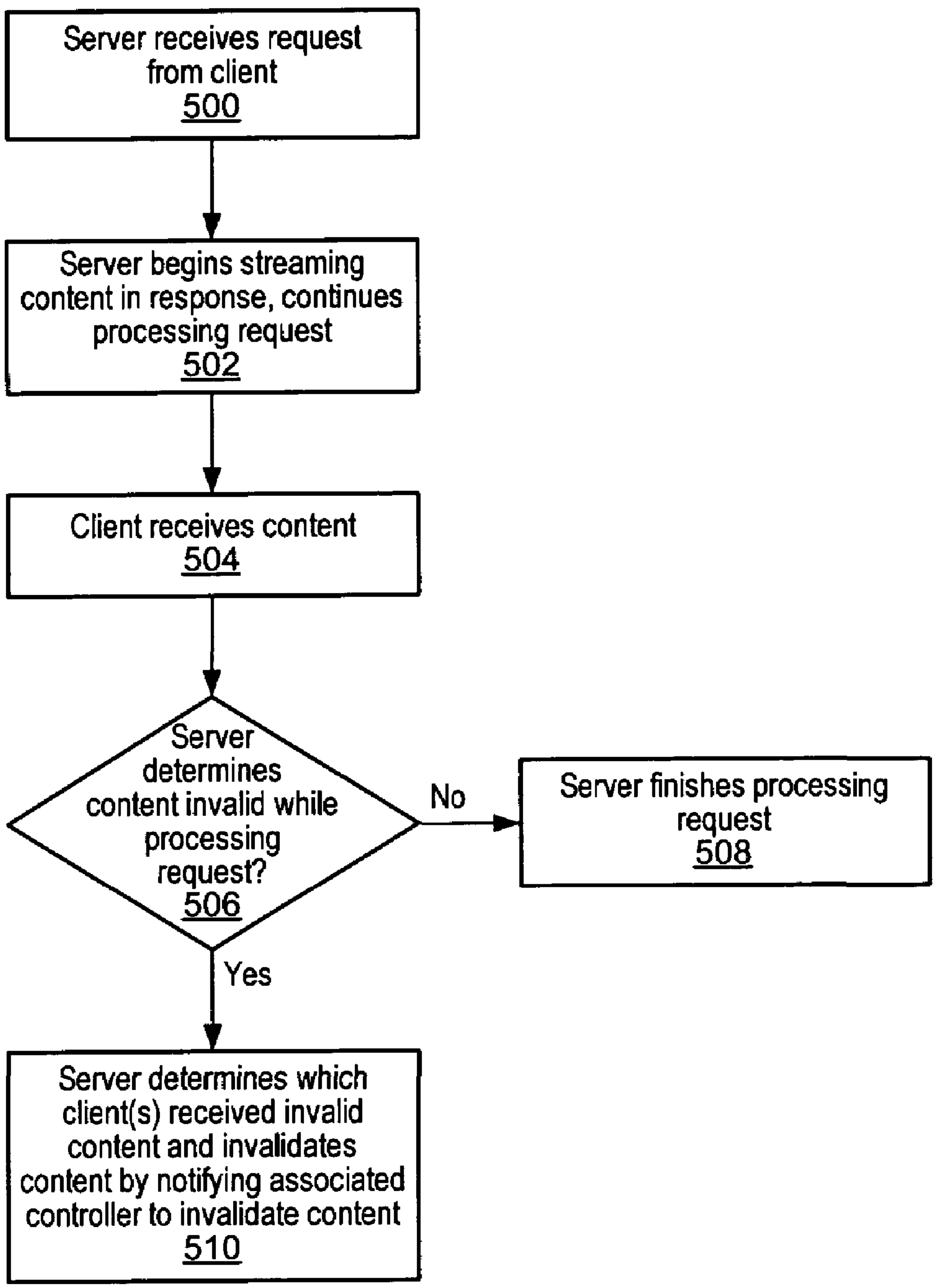
FIG. 5 is a flow diagram illustrating an embodiment of a method for dynamically disabling partially streamed content including using a controller.

Turning now to FIG. 5, a flow diagram illustrating a more specific embodiment of the method illustrated in FIG. 1 is shown. As will be described below, the method may be executable on a server to dynamically disable partially streamed content to a client by instructing a controller to prevent disabled content from being accessed or used, for example.

Referring collectively now to FIGS. 4-5, in 500, server 200 receives a request from a client 230A-C. The request may begin the execution of an application 210A-C on server 200, thereby initiating or continuing a session between client 210A-C and application 210A-C on the server. As described in FIG. 1, in one embodiment, the session may comprise multiple requests and responses between application 210A-C and client 230A-C.

In 502, application 210A-C operating through server 200 may begin to stream content to client 230A-C as a partial fulfillment of the request from client 230A-C, while continuing to process the request. Content may be partially streamed out to minimize latency in the interaction between client and application, as described in FIG. 1. Content disabling mechanism 212 may track specific information on which links streamed to which client lead to which content on server 200, as previously described in FIG. 3.

In 504, client 230A-C may receive content and begin to display or act upon the results therein. In 506, content disabling mechanism 212 may determine that some or all of the content which has been streamed to client 230A-C may be invalid, as described in FIG. 1.

If, in 506, content disabling mechanism 212 determines that no streamed content is invalid, application 230A-C may continue to process the request in 508. Alternatively, if content disabling mechanism 212 determines that the streamed content is invalid, application 210A-C may advance to 510, wherein content disabling mechanism 212 determines which content for which client(s) should be disabled, as described in FIG. 1. Content disabling mechanism 212 may then operate controller 400 on client 230A-C, to prevent client 230A-C from using or from accessing the content to be disabled.

In some embodiments, in disabling the content, the server may allow the session to continue between the client and the application, thereby allowing the client to continue utilizing the application and retrieve content without restarting the entire session. Thus, certain content may be disabled while still preserving the state of the session and/or prior results.

Figure 6A:
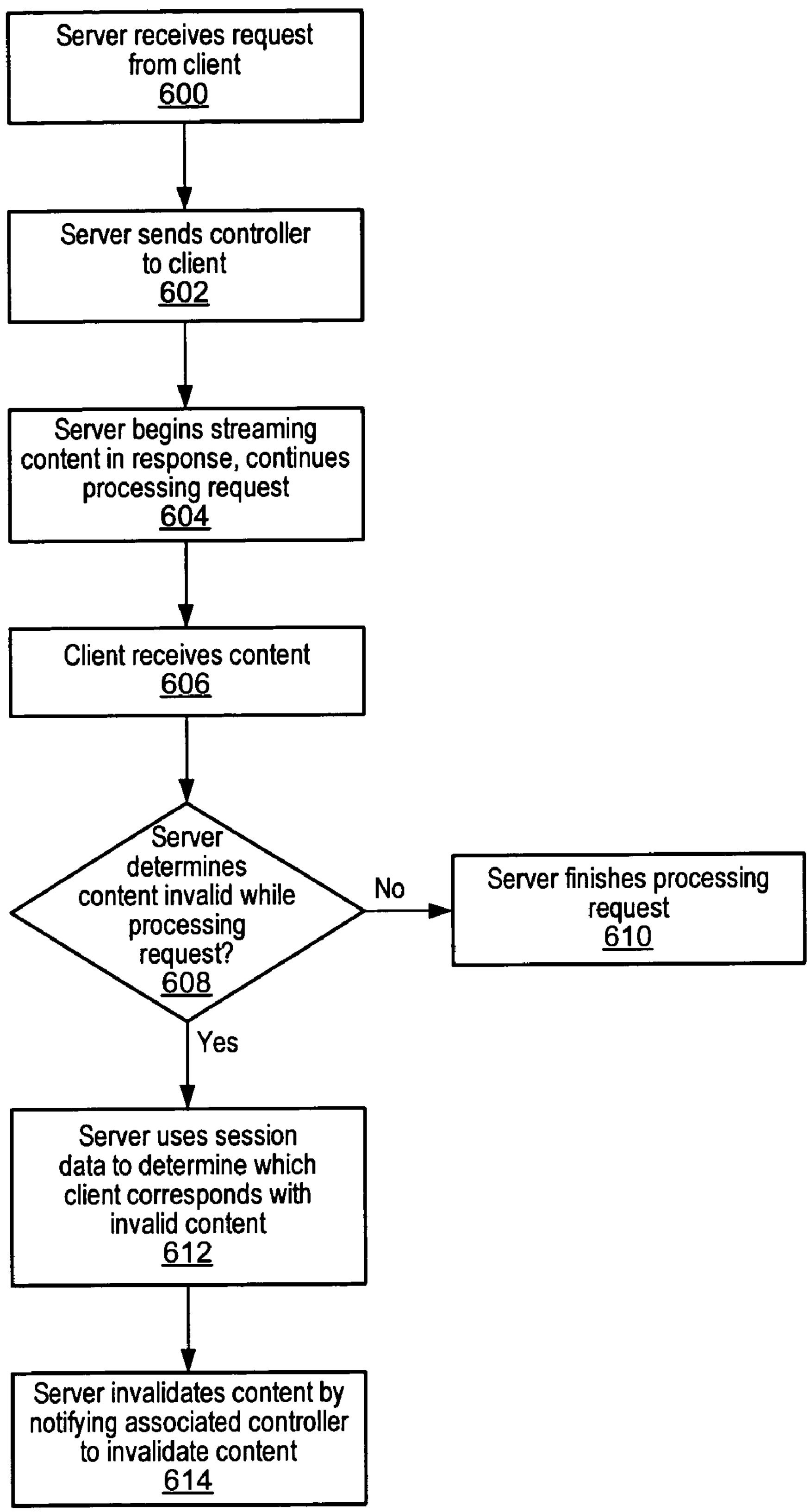
FIGS. 6A and 6B are flow diagrams illustrating embodiments of a method for disabling partially streamed content including using a controller.
Figure 6B:
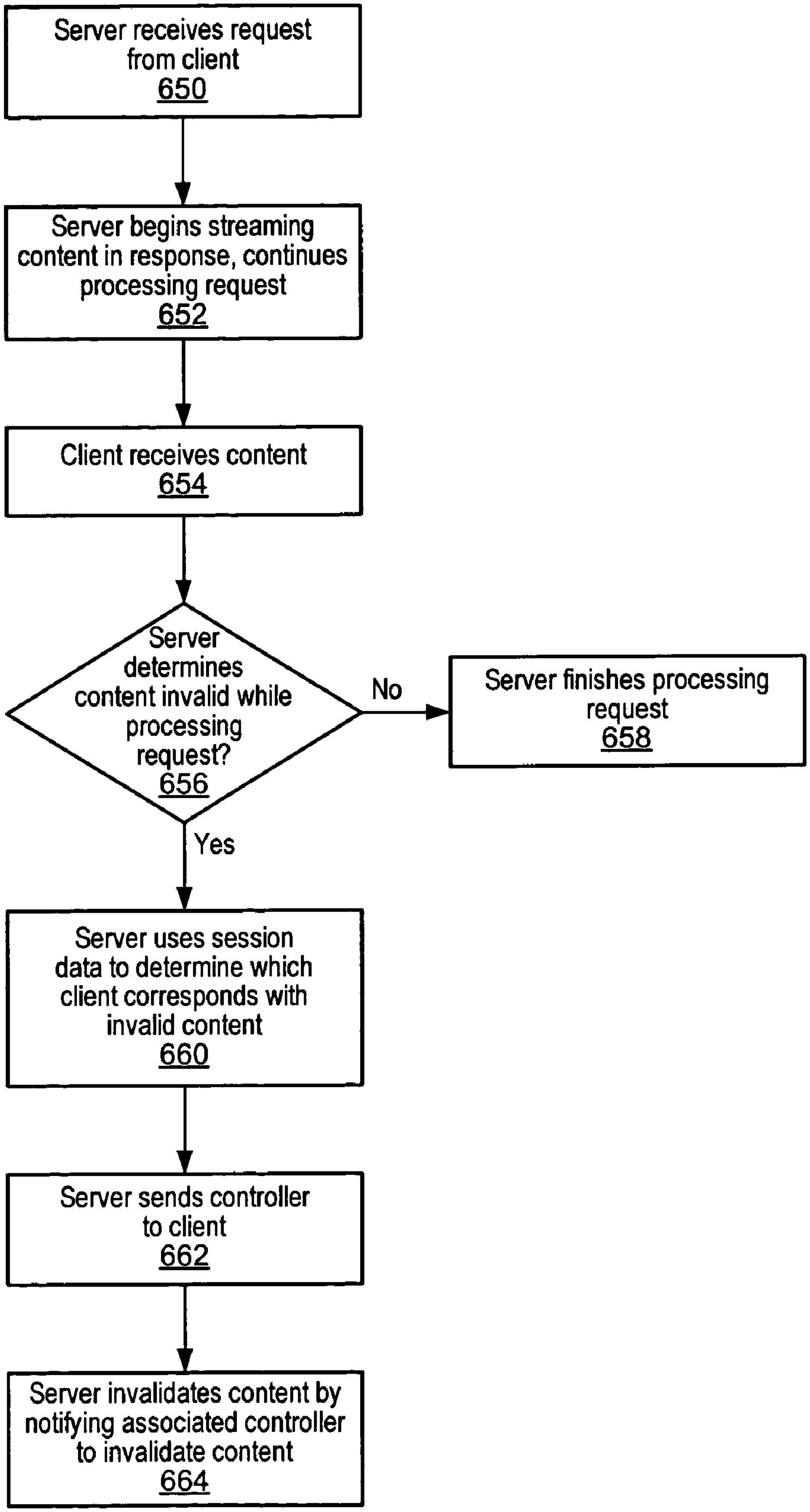

FIGS. 6A and 6B both show a flow diagram illustrating a specific embodiment of the method illustrated in FIG. 5. In both illustrations, the method and functionalities described are substantially similar. However, FIG. 6A illustrates a controller being sent (or downloaded) to a client 230A-C after the initiation of a session, whereas FIG. 6B illustrates a controller being sent after the determination that partially streamed content is invalid.

Turning now to FIG. 6A and referring collectively to FIGS. 4-6A, in 600, server 200 receives a request from a client 230A-C. The request may initiate a session between client 210A-C and application 210A-C on the server. As described in FIG. 1, in one embodiment, the session may comprise multiple requests and responses between application 210A-C and client 230A-C.

In 602, server 200 may send a controller 400 to a client 230C. In one embodiment, the server may download the controller to the client as part of the session initiation. In one embodiment, the server may determine whether or not an appropriate controller is already installed on the client, and download the controller only if an appropriate controller is not already installed on the client. In one embodiment, the controller may comprise one or more Java classes, while in another embodiment, the controller may be an executable or an interpreted script, for example. In one embodiment, the controller may be associated with a web browser, while in another embodiment, the controller may be as stand-alone program or utility.

In 604, application 210A-C operating through server 200 may begin to stream content to client 230A-C as a partial fulfillment of the request from client 230A-C, while continuing to process the request. Content may be partially streamed out to minimize latency in the interaction between client and application, as described in FIG. 1. The server, or content disabling mechanism 212, may then track specific information on which links streamed to which client lead to which content on server 200.

In 606, client 230A-C may receive content and begin to display or act upon the results therein. In 608, the server, or content disabling mechanism 212, may determine that some or all of the content which has been streamed to client 230A-C may be invalid, as described in FIG. 1.

If, in 608, the server, or content disabling mechanism 212, determines that no streamed content is invalid, application 230A-C may continue to process the request in 610. Alternatively, if content disabling mechanism 212 determines that the streamed content is invalid, content disabling mechanism 212 may determine which client and which content should be disabled, as indicated at 612. The server, or content disabling mechanism, may invalidate content streamed to a client by instructing the controller on the client, as indicated at 614.

Turning now to FIG. 6B and referring collectively to FIGS. 4-6B, in 650, server 200 receives a request from a client 230A-C. The request may initiate or continue a session between client 210A-C and application 210A-C on the server. As described in FIG. 1, in one embodiment, the session may comprise multiple requests and responses between application 210A-C and client 230A-C.

In 652, application 210A-C operating through server 200 may begin to stream content to client 230A-C as a partial fulfillment of the request from client 230A-C, while continuing to process the request. Content may be partially streamed out to minimize latency in the interaction between client and application, as described in FIG. 1. Content disabling mechanism 212 may then track specific information on which links streamed to which client lead to which content on server 200.

In 654, client 230A-C may receive content and begin to display or act upon the results therein. In 656, server 200 may determine that some or all of the content which has been streamed to client 230A-C may be invalid, as described in FIG. 1.

If, in 656, server 200, or content disabling mechanism 212, determines that no streamed content is invalid, application 230A-C may continue to process the request in 658. Alternatively, if it is determined that the streamed content is invalid, the server, or content disabling mechanism 212, may determine which content for which client(s) should be disabled, as described in FIG. 1.

In 662, server 200 may send a controller 400 to a client 230C upon determining that content needs to be disabled for that client. In one embodiment, the controller may comprise one or more Java classes, while in another embodiment, the controller may be an executable or an interpreted script, for example. In one embodiment, the controller may be associated with a web browser, while in another embodiment, the controller may be as stand-alone program or utility. In 664, the server, or content disabling mechanism 212, may operate controller 400 to prevent client 230A-C from accessing any content. For example, the controller may prevent copying or saving of the content. Or the controller may prevent further display of the content. Or the controller may disable hyperlinks in the content. In some embodiments, the controller may interact with a client browser application to perform these various types content disabling.

It is noted that various embodiments may combine the various aspects of the functionalities discussed herein. For example, content disabling mechanism 212 may directly manage hyperlinks, while utilizing controller 400 to prevent a client from saving, copying or printing partially streamed content.

Figure 7:
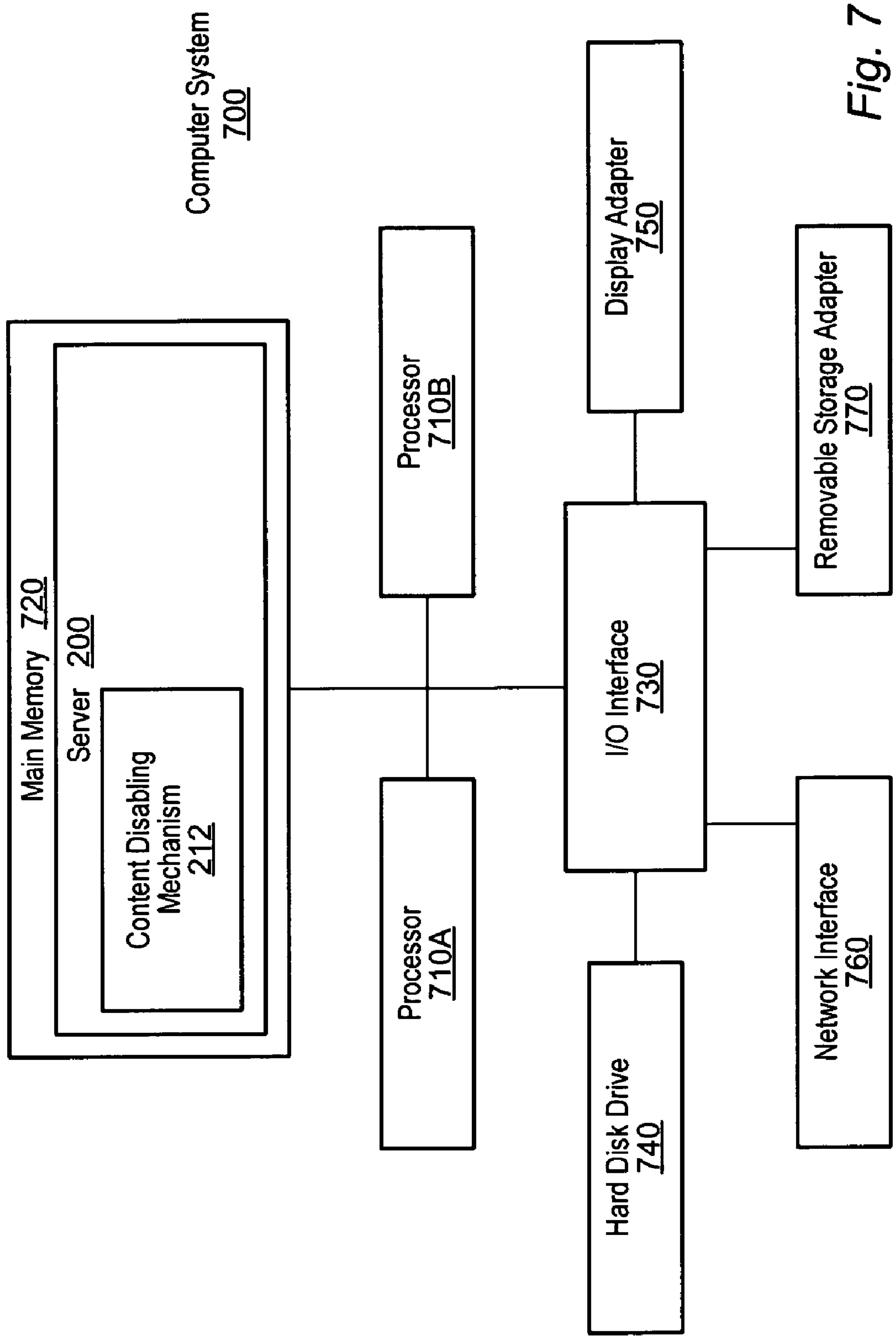
FIG. 7 illustrates an exemplary server for implementing certain embodiments.

Turning now to FIG. 7, an exemplary computer system 700 is shown. Computer system 700 may include main memory 720, which may be coupled to multiple processors 710A-B, and I/O interface 730. It is noted that the number of processors is purely illustrative, and that one or more processors may be resident on the system. I/O interface 730 may connect to network interface 760, hard disk drive 740, display adapter 750, and/or removable storage adapter 770. Such a system is exemplary of a laptop, desktop, server, workstation, or other computing device.

Processors 710A-B may be representative of any of various types of processors such as an ×86 processor, a PowerPC processor or a CPU from the SPARC family of RISC processors. Likewise, main memory 720 may be representative of any of various types of memory, including DRAM, SRAM, EDO RAM, SDRAM, DDR SDRAM, Rambus RAM, etc., or a non-volatile memory such as a magnetic media, e.g., a hard drive, or optical storage. It is noted that in other embodiments, main memory 720 may include other types of suitable memory as well, or combinations of the memories mentioned above.

As described in detail above in conjunction with FIGS. 1-6B, processors 710A-B of computer system 700 may execute software configured to execute a method for dynamically disabling partially streamed content. The software may be stored in memory 720 of computer subsystem 700 in the form of instructions and/or data that implement the operations described above.

For example, FIG. 7 illustrates an exemplary server 200 and content disabling mechanism 212 stored in main memory 720. The instructions and/or data that comprise these and all other included components may be executed on one or more of processors 710A-B, thereby implementing the various functionalities of the method and system described in FIGS. 1-6B.

Various embodiments may further include receiving, sending or storing instructions and/or data that implement the operations described above in conjunction with FIGS. 1-6B upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:

processing a request from a client, wherein the request initiates or continues a session between a server and the client;

streaming out a portion of content from the server to the client as a partial fulfillment of the request;

while processing the request and subsequent to said streaming out the portion of content:

determining if access to the portion of content or additional content referenced by the portion of content should be disabled; and in response to determining that access to the portion of content or the additional content should be disabled, disabling access to the respective content without terminating the session.

2. The method of claim 1, wherein said determining comprises detecting an occurrence of a security violation during said processing.

3. The method of claim 1, wherein said determining comprises detecting an occurrence of a process timeout.

4. The method of claim 1, wherein said disabling comprises preventing the client from accessing content referenced by a hyperlink associated with the portion of content streamed to the client.

5. The method of claim 4, wherein said preventing comprises:

maintaining a lookup table of all hyperlinks associated with the portion of content streamed to the client; and invalidating the hyperlinks by modifying said lookup table to redirect the hyperlinks to an error message.

6. The method of claim 1, wherein said disabling comprises instructing a controller on the client to disable the portion of content received by the client.

7. The method of claim 6, wherein the controller is provided by the server and independent from any application running on the server.

8. The method of claim 6, wherein the controller is specific to an application running on the server.

9. The method of claim 6, wherein the controller is operable to disable access to the respective portion of content by prohibiting the respective portion of content from being copied or saved.

10. The method of claim 6, wherein the controller is provided by the client.

11. The method of claim 6, further comprising sending the controller to the client.

12. The method of claim 11, further comprising sending the controller to the client at the beginning of the session.

13. The method of claim 11, further comprising sending the controller to the client in response to said determining that access to the portion of content or the additional content should be disabled.

14. A system, comprising:

one or more processors; and memory accessible by the one or more processors and configured to store program instructions executable by the one or more processors to implement a server configured to:

process a request from a client, wherein said request initiates or continues a session between the server and the client;

stream out a portion of content from the server to the client as a partial fulfillment of the request;

wherein the server comprises a content disabling mechanism configured to:

determine if access to the portion of content or additional content referenced by the portion of content should be disabled, wherein the content disabling mechanism is configured to perform said determining while processing said request and subsequent to said streaming out the portion of content; and if access to the portion of content or the additional content should be disabled, disable access to the respective content without terminating said session.

15. The system of claim 14, wherein the content disabling mechanism is configured to determine that said access to the portion of content or the additional content should be disabled in response to an occurrence of a security violation during the processing of the request.

16. The system of claim 14, wherein the content disabling mechanism is configured to determine that said access to the portion of content or the additional content should be disabled in response to an occurrence of a process timeout.

17. The system of claim 14, wherein to disable access to the respective content, the content disabling mechanism is configured to prevent a user from accessing content referenced by a hyperlink associated with the portion of content streamed to the client.

18. The system of claim 17, wherein to prevent a user from accessing content referenced by a hyperlink, the content disabling mechanism is configured to maintain a lookup table of all hyperlinks associated with the portion of content streamed to the client, and invalidate one or more of the hyperlinks by modifying said lookup table to redirect the one or more hyperlinks to an error message.

19. The system of claim 14, further comprising a controller, wherein the controller is operable by the content disabling mechanism to prevent a user from accessing said hyperlink associated with the portion of content.

20. The system of claim 19, wherein the controller is provided by the server and independent from any application run on the server.

21. The system of claim 19, wherein the controller is specific to an application run by the server.

22. The system of claim 19, wherein the controller is operable by the content disabling mechanism to prohibit the portion of content from being copied or saved.

23. The system of claim 19, wherein the controller is built into the client.

24. The system of claim 19, wherein the server is further configured to send the controller to the client.

25. The system of claim 24, wherein the server is further configured to send the controller to the client at the beginning of the session.

26. The system of claim 24, wherein the server is further configured to send the controller to the client in response to determining that said portion of content should be invalidated.

* * * * *